(12) United States Patent
Tian et al.

(10) Patent No.: US 12,488,929 B2
(45) Date of Patent: Dec. 2, 2025

(54) MAGNETIC APPARATUS, AND VOLTAGE CONVERTER INCLUDING THE SAME

(71) Applicant: Telefonaktiebolaget LM Ericsson (publ), Stockholm (SE)

(72) Inventors: Jiashen Tian, Beijing (CN); Huajuan Xiao, Beijing (CN); Donghao Li, Beijing (CN); Biao Chen, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 233 days.

(21) Appl. No.: 18/023,104

(22) PCT Filed: Aug. 25, 2020

(86) PCT No.: PCT/CN2020/111118
§ 371 (c)(1),
(2) Date: Feb. 24, 2023

(87) PCT Pub. No.: WO2022/040925
PCT Pub. Date: Mar. 3, 2022

(65) Prior Publication Data
US 2024/0029939 A1    Jan. 25, 2024

(51) Int. Cl.
*H01F 27/26* (2006.01)
*H01F 3/10* (2006.01)
(Continued)

(52) U.S. Cl.
CPC .............. *H01F 27/26* (2013.01); *H01F 3/10* (2013.01); *H01F 3/14* (2013.01); *H01F 27/38* (2013.01);
(Continued)

(58) Field of Classification Search
CPC ... H01F 27/26; H01F 3/10; H01F 3/14; H01F 27/38; H01F 27/40; H01F 2027/408;
(Continued)

(56) References Cited

U.S. PATENT DOCUMENTS 8,975,995 B1    3/2015   Ikriannikov
2005/0068144 A1*  3/2005  Miettinen ............. H01F 27/385
336/182
(Continued)

FOREIGN PATENT DOCUMENTS

CN    101308724 A    11/2008
CN    201266888 Y     7/2009
(Continued)

OTHER PUBLICATIONS

International Search Report and Written Opinion with Transmittal issued in International Application No. PCT/CN2020/111118 dated Apr. 25, 2021 (9 pages).

(Continued)

*Primary Examiner* — Gary L Laxton
(74) *Attorney, Agent, or Firm* — Rothwell, Figg, Ernst & Manbeck, P.C.

(57) ABSTRACT

The present disclosure relates to a magnetic apparatus, and a voltage converter including the same. The magnetic apparatus comprises: a first magnetic core (1), including a first planar body (11); a second magnetic core (2), including a second planar body (21); and a third magnetic core (3), including a third planar body (31). The first, second, and third magnetic core (3) are sequentially stacked. The magnetic apparatus further comprises: a first column (101) for a transformer, located between and basically perpendicular to the first planar body (11) and the second planar body (21); at least two second columns (102) for at least two inductors, located between and basically perpendicular to the second planar body (21) and the third planar body (31).

13 Claims, 4 Drawing Sheets

(51) Int. Cl.
*H01F 3/14* (2006.01)
*H01F 27/38* (2006.01)
*H01F 27/40* (2006.01)
*H02M 1/00* (2006.01)
*H02M 3/00* (2006.01)
*H02M 3/335* (2006.01)

(52) U.S. Cl.
CPC .......... *H01F 27/40* (2013.01); *H02M 1/0064* (2021.05); *H02M 3/003* (2021.05); *H02M 3/33573* (2021.05); *H02M 3/33576* (2013.01); *H01F 2027/408* (2013.01)

(58) Field of Classification Search
CPC ............. H02M 3/33573; H02M 3/003; H02M 1/0064; H02M 3/33576
See application file for complete search history.

(56) References Cited

U.S. PATENT DOCUMENTS

| | | |
|---|---|---|
| 2006/0290458 A1 | 12/2006 | Sano |
| 2009/0046486 A1 | 2/2009 | Lu et al. |
| 2009/0303652 A1 | 12/2009 | Tallam et al. |
| 2018/0040420 A1 | 2/2018 | Poddar |
| 2018/0061560 A1* | 3/2018 | Wukovits ................ H02M 3/24 |

FOREIGN PATENT DOCUMENTS

| | | |
|---|---|---|
| CN | 102349120 A | 2/2012 |
| CN | 203931733 U | 11/2014 |
| CN | 104752045 A | 7/2015 |
| CN | 103578691 B | 8/2016 |
| CN | 106373734 A | 2/2017 |
| EP | 3349224 A1 | 7/2018 |
| KR | 20200095141 A | 8/2020 |
| WO | 2008101367 A1 | 8/2008 |

OTHER PUBLICATIONS

International Preliminary Report on Patentability with Transmittal issued in International Application No. PCT/CN2020/111118 dated Aug. 30, 2021 (33 pages).

* cited by examiner

MAGNETIC APPARATUS, AND VOLTAGE CONVERTER INCLUDING THE SAME

CROSS REFERENCE TO RELATED APPLICATIONS

This application is a 35 U.S.C. § 371 National Stage of International Patent Application No. PCT/CN2020/111118, filed 2020 Aug. 25.

TECHNICAL FIELD

The present disclosure relates generally to the electric circuitry technology, and in particular, to a magnetic apparatus, and a voltage converter including the same.

BACKGROUND

This section introduces aspects that may facilitate better understanding of the present disclosure. Accordingly, the statements of this section are to be read in this light and are not to be understood as admissions about what is in the prior art or what is not in the prior art.

In many circuits, such as a voltage converter, a transformer and/or an inductor, including magnetic component, usually have much bigger size than other electric components, and thus they are the key features for the overall size of such circuit.

SUMMARY

Certain aspects of the present disclosure and their embodiments may provide solutions to these or other challenges. There are, proposed herein, various embodiments which address one or more of the issues disclosed herein.

Usually, magnetic components, such as these for each of a transformer and/or an inductor, are designed, manufactured and packed separately. Then, the transformer and/or the inductor are assembled together in a specific circuit, such as a voltage converter. Therefore, the size of the specific circuit, such as the voltage converter is hard to be reduced.

Certain aspects of the present disclosure and their embodiments may provide solutions to these or other challenges. There are, proposed herein, various embodiments which address one or more of the issues disclosed herein. Improved magnetic apparatus, and voltage converter including the same are provided for at least reducing the overall size of a circuit assembly.

A first aspect of the present disclosure provides a magnetic apparatus, comprising: a first magnetic core, including a first planar body; a second magnetic core, including a second planar body; and a third magnetic core, including a third planar body. The first magnetic core, the second magnetic core, and third magnetic core are sequentially stacked. The magnetic apparatus further comprises: a first column for a transformer, located between and basically perpendicular to the first planar body and the second planar body; and at least two second columns for at least two inductors, located between and basically perpendicular to the second planar body and the third planar body.

In embodiments of the present disclosure, the magnetic apparatus comprises: at least two second columns respectively for at least two inductors, located between and basically perpendicular to the second planar body and the third planar body; and at least one third column, wherein each of the at least one third column is located between two second columns of the at least two second columns.

In embodiments of the present disclosure, the first column is located basically on a center of the first planar body. The magnetic apparatus further comprises: a fourth column, located basically on an edge position of the first planar body and in parallel with the first column.

In embodiments of the present disclosure, the first magnetic core is an E type core.

In embodiments of the present disclosure, a magnetic path of the transformer is configured to go through the first column, the second planar body, the fourth column, and the first planar body.

In embodiments of the present disclosure, the at least two second columns and the at least one third column are located on the third planar body, and sequentially along a direction in parallel with the third planar body.

In embodiments of the present disclosure, in a sectional plane perpendicular to the third planar body, the third magnetic core has a shape comprising a plurality of "T" shaped structures connected sequentially.

In embodiments of the present disclosure, with regard to a direction in parallel with the third planar body, an outer side surface of a coil of an inductor of the at least two inductors is exposed.

In embodiments of the present disclosure, the at least one third column contacts with the second planar body, and a gap is located between a second column of the at least two second columns and the second planar body.

In embodiments of the present disclosure, in a plane in parallel with the third planar body, a cross-sectional area of a third column of the at least one third column is bigger than a cross-sectional area of a second column of the at least two second columns.

In embodiments of the present disclosure, the cross-sectional area of the third column is bigger than or equal to two times of the cross-sectional area of the second column.

In embodiments of the present disclosure, a magnetic path of an inductor of the at least two inductors is configured to go through a second column of the at least two second columns, the second planar body, a third column of the at least one third column, and the third planar body.

In embodiments of the present disclosure, two magnetic paths of two inductors adjacent to a same third column are configured to go through the same third column along a same direction.

In embodiments of the present disclosure, the second magnetic core is an I type core.

A second aspect of the present disclosure provides a voltage converter, comprising: switching part, switching an input voltage of the voltage converter; transformer, transforming an output of the switching part; rectifying part, rectifying an output of the transformer to generate an output voltage of the voltage converter. A magnetic part of the transformer and a magnetic part of an inductor of the rectifying part are provided by the magnetic apparatus according to any of embodiments above described.

In embodiments of the present disclosure, the voltage converter comprises a current-doubler-rectifier converter.

In embodiments of the present disclosure, the rectifying part comprises two inductors.

Embodiments herein afford many advantages. For example, in embodiments herein, magnetic cores for different circuit components, such as a transformer and/or an inductor, are integrated together, and thus an overall size of a specific circuit assembly, such as a voltage converter, may be reduced. A person skilled in the art will recognize additional features and advantages upon reading the following detailed description.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Conventionally, in the electric circuit, the magnetic components (such as a transformer, and/or an inductor) are arranged separately, consuming large space.

Figure 1:
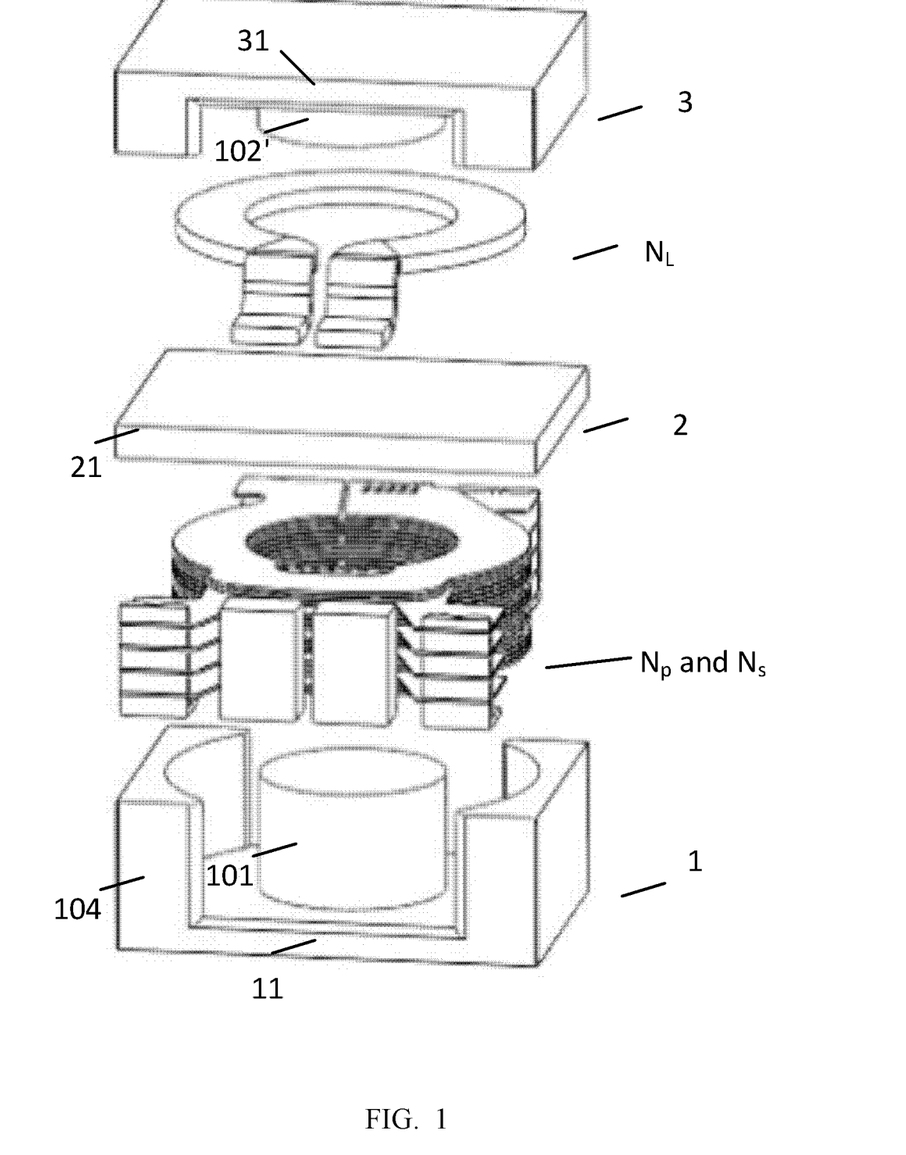
FIG. 1 is an exemplary diagram showing an explosion view of a magnetic apparatus, according to embodiments of the present disclosure.

FIG. 1 is an exemplary diagram showing an explosion view of a magnetic apparatus, according to embodiments of the present disclosure.

As shown in FIG. 1, a magnetic apparatus comprises: a first magnetic core 1, including a first planar body 11; a second magnetic core 2, including a second planar body 21; and a third magnetic core 3, including a third planar body 31. The first magnetic core 1, the second magnetic core 2, and third magnetic core 3 are sequentially stacked. The magnetic apparatus further comprises: a first column 101 for a transformer, located between and basically perpendicular to the first planar body 11 and the second planar body 21; and at least one second column 102' for at least one inductor, located between and basically perpendicular to the second planar body 21 and the third planar body 31.

According to embodiments of the present disclosure, the second magnetic core 2 may provide magnetic paths for both the transformer (with coils $N_p$ and $N_s$), and the inductor (with a coil $N_L$). That is, magnetic cores 1, 2, 3 for different circuit components, such as the transformer and/or the inductor, are integrated together, and thus an overall size of a specific circuit assembly, such as a voltage converter, may be reduced.

Further, the magnetic core 1 may be an E type core; the magnetic core 2 may be an I type core; and magnetic core 3 may be an E type core. It should be understood any other types of magnetic core may also be applicable.

Figure 2:
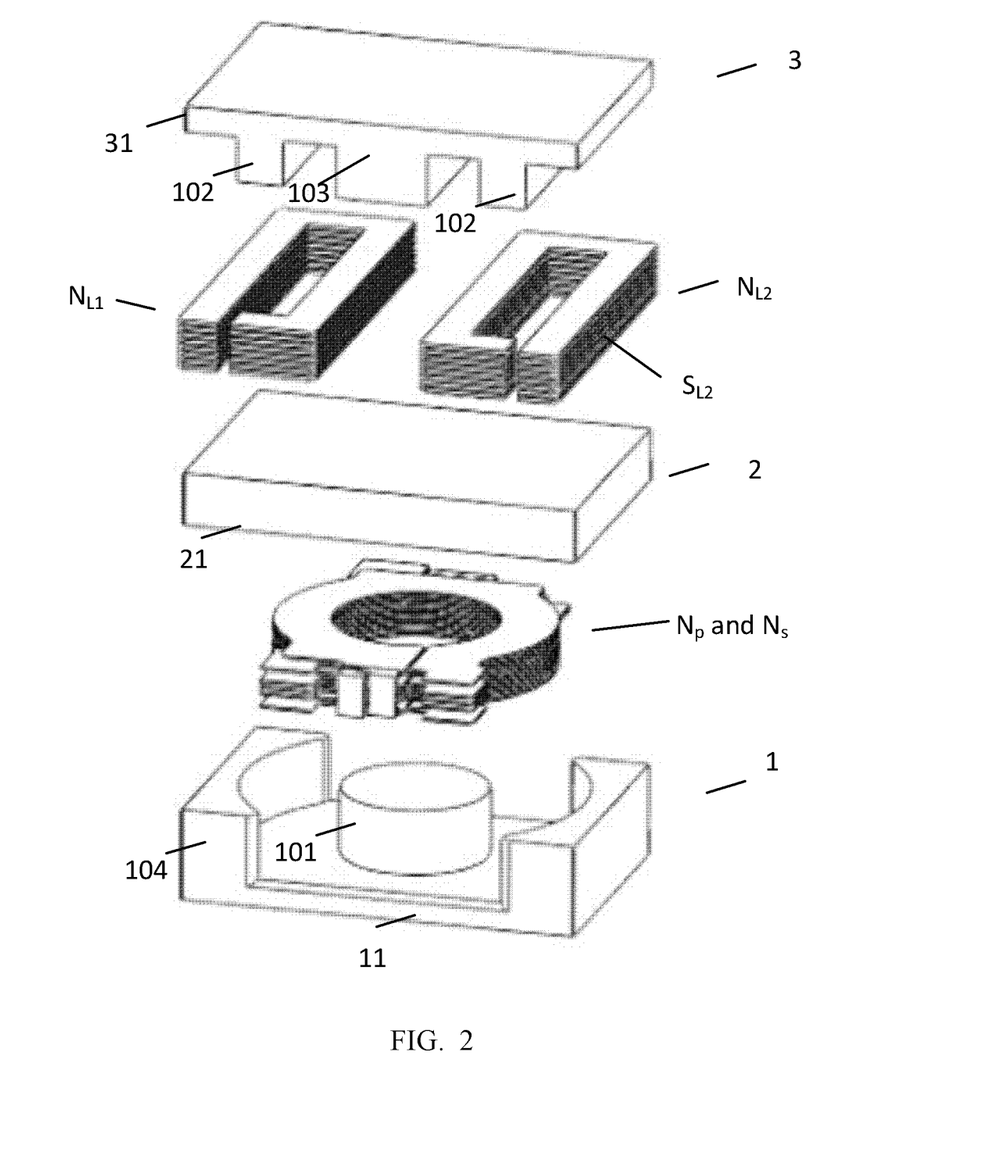
FIG. 2 is another exemplary diagram showing an explosion view of another magnetic apparatus, according to embodiments of the present disclosure.

FIG. 2 is another exemplary diagram showing another explosion view of a magnetic apparatus, according to embodiments of the present disclosure.

As shown in FIG. 2, a magnetic apparatus comprises: a first magnetic core 1, including a first planar body 11; a second magnetic core 2, including a second planar body 21; and a third magnetic core 3, including a third planar body 31. The first magnetic core 1, the second magnetic core 2, and third magnetic core 3 are sequentially stacked. The magnetic apparatus further comprises: a first column 101 for a transformer, located between and basically perpendicular to the first planar body 11 and the second planar body 21; at least two second columns 102 respectively for at least two inductors, located between and basically perpendicular to the second planar body 21 and the third planar body 31; and at least one third column 103, wherein each of the at least one third column 103 is located between two second columns 102 of the at least two second columns 102.

According to embodiments of the present disclosure, the magnetic apparatus as shown in FIG. 2 is particularly applicable for a specific circuit assembly with more than one inductor, such as a current-doubler-rectifier (CDR) converter.

In embodiments of the present disclosure, the first column 101 is located basically on a center of the first planar body 11. The magnetic apparatus further comprises: a fourth column 104, located basically on an edge position of the first planar body 11 and in parallel with the first column 101.

It should be understood, it is also possible to arrange the first column 101 and/or the fourth column 104 on the second planar body 21.

In embodiments of the present disclosure, the at least two second columns 102 and the at least one third column 103 are located on the third planar body 31, and sequentially along a direction in parallel with the third planar body 31.

It should be understood, it is also possible to arrange the second column 102 and/or the third column 103 on the second planar body 21.

In embodiments of the present disclosure, in a sectional plane perpendicular to the third planar body 31, the third magnetic core 3 has a shape comprising a plurality of "T" shaped structures connected sequentially, as shown in the FIG. 2.

According to embodiments of the present disclosure, more than one combination of two second columns 102 and one third magnetic core 3 between them may be arranged, to support more than two inductors.

In embodiments of the present disclosure, with regard to a direction in parallel with the third planar body 31, an outer side surface of a coil of an inductor of the at least two inductors is exposed.

According to embodiments of the present disclosure, for example, the outer side surface $S_{L2}$ of the coil $N_{L2}$ may be exposed, to improve heat dissipation.

The first magnetic core 1 may be E type, the second magnetic core 2 may be I type, and third magnetic core 3 may be a unique type. Thus, as shown in FIG. 2, the cores of the integrated magnetic (IM) component are consisted of E type 1, I type 2 and a unique type 3, the gaps are set on unique core (3). The coils/windings of integrated magnetic component include three parts, where the winding of transformer $N_p$ and $N_s$ are wound on the centre column 101 of E core, the inductor windings $N_{L1}$ and $N_{L2}$ are wound on the side columns 102 of unique core. The I core 2 and the centre column 103 of unique core are the low reluctance columns, compared to the side column 102 and planar body 31 of unique core 3, the planar body 11 of E core 1.

Figure 3:
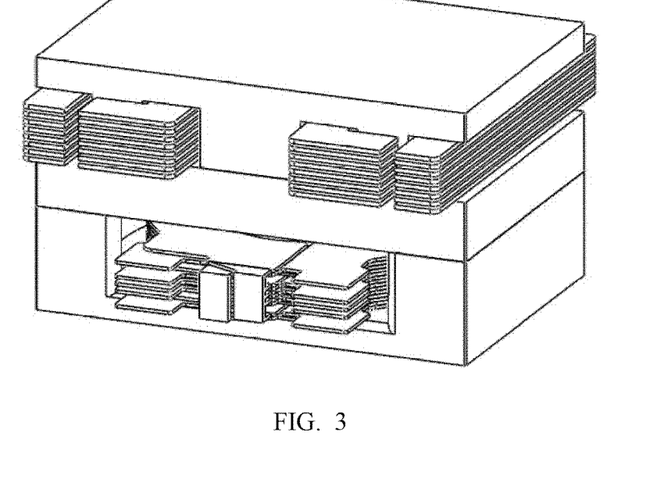
FIG. 3 is an exemplary diagram showing an assembled view of parts in the FIG. 2, according to embodiments of the present disclosure.

FIG. 3 is an exemplary diagram showing an assembled view of parts in the FIG. 2, according to embodiments of the present disclosure.

As shown in FIG. 3, the coils $N_{L1}$, $N_{L2}$ extends outside of the magnetic cores 2, 3 along a direction perpendicular to the FIG. 3 itself, to provide contacts for electric connection, and also improve heat dissipation.

FIG. 3 shows the assemble of IM component. One example for the height of assemble is 18 mm, length is 25 mm, width is 28 mm.

If separated, the height of separated transformer may be 13.5 mm, length may be 25 mm, and width may be 28 mm. The height of separated inductor may be 10 mm, length may be 15 mm, and width may be 15 mm.

By comparison, the assemble is higher integration, higher power density (promote about 10%) and lower on-board space (save about 50%), while the overall size may be less than 90% of being separated.

Figure 4:
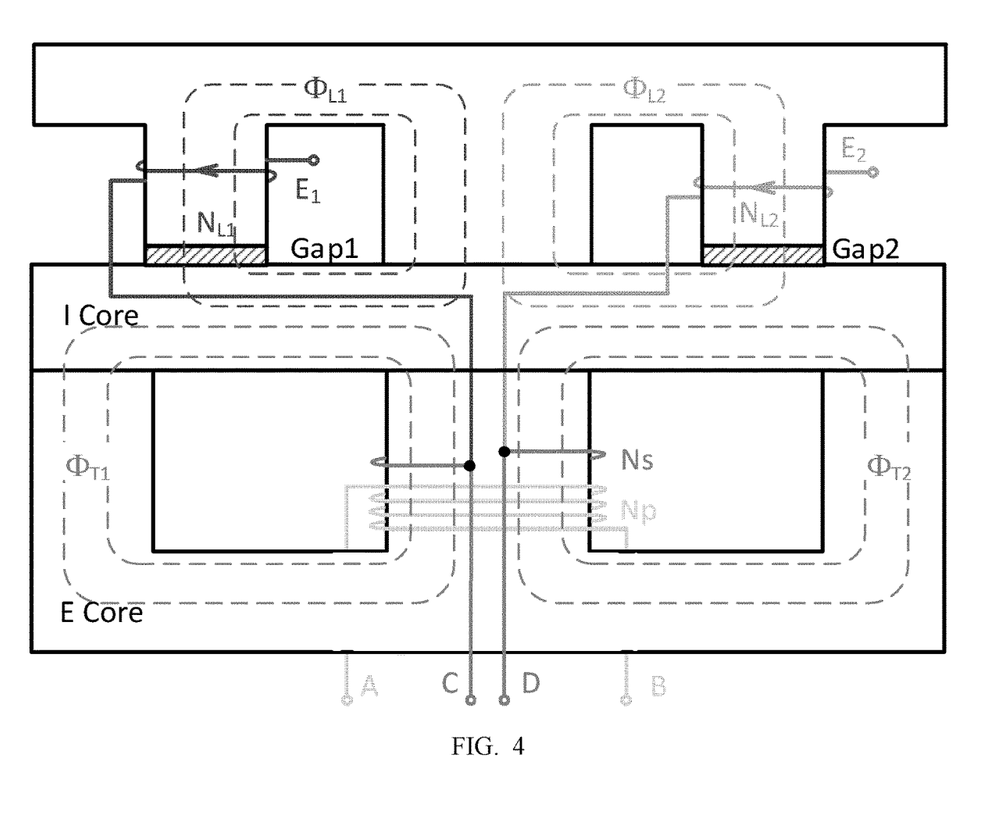
FIG. 4 is an exemplary diagram showing magnetic paths of the magnetic apparatus as shown in FIG. 2, according to embodiments of the present disclosure.

FIG. 4 is an exemplary diagram showing magnetic paths of the magnetic apparatus as shown in FIG. 2, according to embodiments of the present disclosure.

In embodiments of the present disclosure, a magnetic path of the transformer is configured to go through the first column 101, the second planar body 21, the fourth column, and the first planar body 11.

Particularly, $\Phi_{T1}$ and $\Phi_{T2}$ may refer to two possible magnetic paths of coils $N_p$ and $N_s$. The coils $N_p$ and $N_s$ may comprise a primary side coil $N_p$, and a secondary side coil $N_s$.

The primary side coil $N_p$ have two contacts A, B, and the secondary side coil $N_s$ have two contacts C, D.

In embodiments of the present disclosure, the at least one third column 103 contacts with the second planar body 21, and a gap (Gap1, or Gap2) is located between a second column 102 of the at least two second columns 102 and the second planar body 21.

In embodiments of the present disclosure, in a plane in parallel with the third planar body 31, a cross-sectional area of a third column 103 of the at least one third column 103 is bigger than a cross-sectional area of a second column 102 of the at least two second columns 102.

Particularly, in embodiments of the present disclosure, the cross-sectional area of the third column 103 is bigger than or equal to two times of the cross-sectional area of the second column 102.

In embodiments of the present disclosure, a magnetic path of an inductor of the at least two inductors is configured to go through a second column 102 of the at least two second columns 102, (the gap), the second planar body 21, a third column 103 of the at least one third column 103, and the third planar body 31.

Particularly, in embodiments of the present disclosure, two magnetic paths of two inductors adjacent to a same third column 103 are configured to go through the same third column 103 along a same direction.

Particularly, $\Phi_{L1}$ and $\Phi_{L2}$ may refer to two magnetic paths of coils $N_{L1}$ and $N_{L2}$, respectively. The coil $N_{L1}$ may comprise a contact E1, while another contact of the coil $N_{L1}$ is connected to the contact C. The coils $N_{L2}$ may comprise a contact E2, while another contact of the coil $N_{L2}$ is connected to the contact D.

FIG. 3 shows the 2D drawing of the IM component, the transformer windings and inductor windings are uncoupled by adding low reluctance column of core. The main fluxes $\Phi_{T1}$ and $\Phi_{T2}$ are caused by transformer windings. The main fluxes $\Phi_{L1}$ and $\Phi_{L2}$ are caused by inductor windings. As the unique structure of core, the main fluxes are uncoupled each other. At unique core, the cross-area of middle column may be double of side column. The cross-area of I core is sum of center columns cross areas of E core and unique core. The gaps are set on the side columns of unique core, to further adjust the fluxes.

Figure 5:
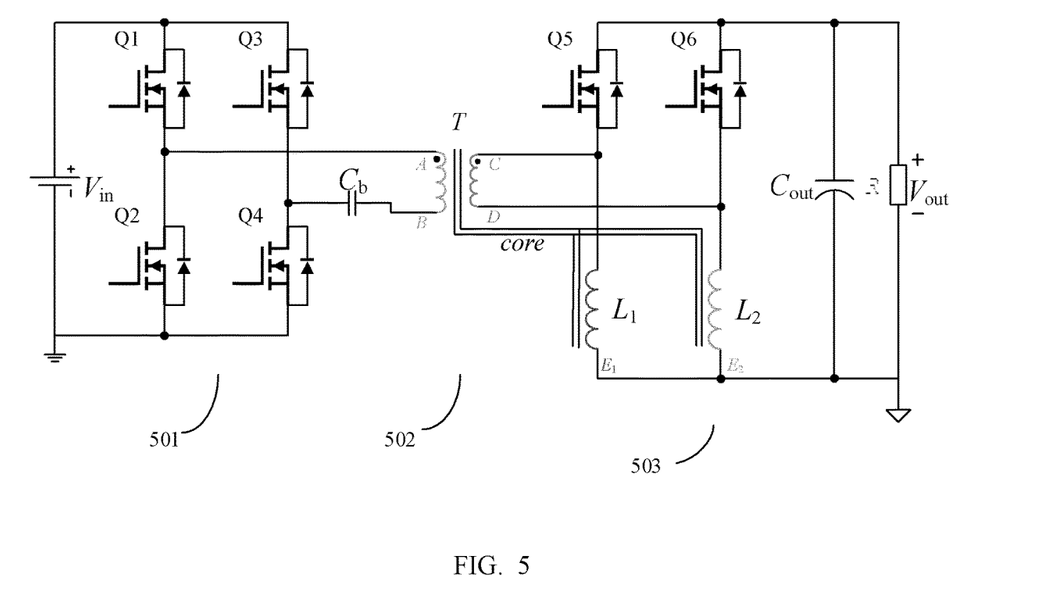
FIG. 5 is an exemplary electric circuit diagram of the voltage converter, according to embodiments of the present disclosure.

FIG. 5 is an exemplary electric circuit diagram of the voltage converter, according to embodiments of the present disclosure.

As shown in FIG. 5, the voltage converter comprises: a switching part 501, switching an input voltage Vin of the voltage converter; a transformer 502, transforming an output of the switching part 501; a rectifying part 503, rectifying an output of the transformer 502 to generate an output voltage Vout of the voltage converter. A magnetic part of the transformer 502 and a magnetic part of an inductor L1, L2 of the rectifying part 503 are provided by the magnetic apparatus according to any of embodiments above described, such as shown in FIG. 1 and/or FIG. 2.

The switching part 501 may comprising four switching elements Q1, Q2, Q3, Q4 forming a full-bridge structure, so as to generate an alternative current voltage based on a direct current voltage Vin. After a capacitor Cb, the generated alternative current voltage is inputted to the transformer 502 (i.e. T). The rectifying part 503 comprises two branches in parallel, each including a switching element (Q5 or Q6) and an indicator (L1 or L2) in series. The rectifying part 503 further comprises an output capacitor Cout. R may present an output resistor or a load.

According to embodiments of the present disclosure, all the magnetic parts of the voltage converter may be integrated (as "core"). Thus, an overall size of a specific circuit assembly, such as a voltage converter, may be reduced.

In embodiments of the present disclosure, the voltage converter comprises a current-doubler-rectifier CDR converter.

In embodiments of the present disclosure, the rectifying part comprises two inductors L1, L2.

According to embodiments of the present disclosure, the magnetic apparatus is particularly applicable for a specific circuit assembly with more than one inductor, such as a current-doubler-rectifier (CDR) converter as shown in FIG. 5.

The current-doubler-rectifier converter have a good performance for high current DC-DC application. The stress of secondary MOSFET (Q5 and Q6) in CDR is half of the MOSFET in full-bridge rectifier. There is no middle-point in transformer. The three main magnetic components (if separated) in CDR converter are too big to improve power density.

Usually, one magnetic component has one coil/winding (with a plurality of turns) and one magnetic core. However, the above IM component has 4 coils/windings but share one integrated magnetic core component. The on-board area approximately reduces 50% than before, with the same performance. Particularly, the third magnetic core 3 is also designed to improve the heat dissipation.

By integrated magnetic (IM) manner provided by embodiments of the present disclosure, the three main magnetic components are replaced of one IM component. In addition, a CDR converter with IM component is provided.

According to embodiments of the present disclosure, the design of different magnetic paths ensures different frequencies, different functions of the three magnetic components of converter. Further, the working temperature may be reduced due to heat dissipation design.

By such integrated magnetic manner, the three main magnetic components of CDR converter are integrated into one. The integrated magnetic component includes four windings and three cores. Because the magnetic cores of IM component work at different frequency, the utilization rate of cores is promoted. The IM component have higher power density than separated components. The space of IM component on board is almost half of the space of separated magnetic components. As a result, the size and weight of CDR converter can be reduced.

For example, the IM CDR converter may be applied to reach higher power density of a 48V/12V DC-DC converter.

The converter includes three main magnetic components, which are two output inductors L1, L2 and one transformer T. By IM manner, the main magnetic components L1, L2 and T are integrated into one core. Low current of MOSFET means low switching loss and low conduction loss. Less magnetic component means low size and high reliability.

It should be understood any other types of circuit with at least one transformer and/or at least one inductor may also be applicable.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

ABBREVIATION EXPLANATION

CDR Current doubler rectifier
IM Integrated magnetic
PSB Power supply board
MOSFET Metal-Oxide semiconductor field effect transistor

The invention claimed is:

1. A magnetic apparatus, comprising:
a first magnetic core, including a first planar body;
a second magnetic core, including a second planar body; and
a third magnetic core, including a third planar body, wherein
the first magnetic core, the second magnetic core, and third magnetic core are sequentially stacked,
the first magnetic core further comprises a first column for a transformer, the first column being located between and basically perpendicular to the first planar body and the second planar body,
the third magnetic core further comprises: a second column, a third column, and a fourth column, each of the second column, third column, and the fourth column being located between and basically perpendicular to the second planar body and the third planar body,
a first inductor coil winds on the second column,
a second inductor coil winds on the fourth column,
the third column is located between the second column and the fourth column,
the second, third, and fourth columns are located on the third planar body, and sequentially along a direction in parallel with the third planar body,
the third column of the third magnetic core contacts the second planar body of the second magnetic core, and
a first gap is located between the second column of the third magnetic core and the second planar body of the second magnetic core, wherein
in a plane in parallel with the third planar body, a cross-sectional area of the third column is larger than a cross-sectional area of the second column.

2. The magnetic apparatus of claim 1, wherein
the first column is located basically on a center of the first planar body; and
the first magnetic core further comprises:
a fifth column, located basically on an edge position of the first planar body and in parallel with the first column.

3. The magnetic apparatus of claim 2, wherein a magnetic path of the transformer is configured to go through the first column, the second planar body, the fifth column, and the first planar body.

4. The magnetic apparatus of claim 1, wherein the first magnetic core is an E type core.

5. The magnetic apparatus of claim 1, wherein in a sectional plane perpendicular to the third planar body, the third magnetic core has a shape comprising a plurality of "T" shaped structures connected sequentially.

6. The magnetic apparatus of claim 1, wherein with regard to a direction in parallel with the third planar body, an outer side surface of the coil of the at least two inductors is exposed.

7. The magnetic apparatus of claim 1, wherein
a second gap is located between the fourth column of the third magnetic core and the second planar body of the second magnetic core.

8. The magnetic apparatus of claim 1, wherein the cross-sectional area of the third column is larger than or equal to two times of the cross-sectional area of the second column.

9. The magnetic apparatus of claim 1, wherein a magnetic path of an inductor of the at least two inductors is configured to go through the second column, the second planar body, the third column, and the third planar body.

10. The magnetic apparatus of claim 9, wherein two magnetic paths of two inductors adjacent to the third column are configured to go through the third column along a same direction.

11. A magnetic apparatus, comprising:
a first magnetic core, including a first planar body;
a second magnetic core, including a second planar body; and
a third magnetic core, including a third planar body, wherein
the first magnetic core, the second magnetic core, and third magnetic core are sequentially stacked,
the first magnetic core further comprises a first column for a transformer, the first column being located between and basically perpendicular to the first planar body and the second planar body,
the third magnetic core further comprises: a second column, a third column, and a fourth column, each of the second column, third column, and the fourth column being located between and basically perpendicular to the second planar body and the third planar body,
a first inductor coil winds on the second column,
a second inductor coil winds on the fourth column,
the third column is located between the second column and the fourth column,
the second, third, and fourth columns are located on the third planar body, and sequentially along a direction in parallel with the third planar body,
the third column of the third magnetic core contacts the second planar body of the second magnetic core,
a first gap is located between the second column of the third magnetic core and the second planar body of the second magnetic core, wherein
in a plane in parallel with the third planar body, a cross-sectional area of the third column is larger than a cross-sectional area of the second column, and
the second magnetic core is an I type core.

12. A voltage converter, comprising:
a switching part, switching an input voltage (Vin) of the voltage converter;
a transformer, transforming an output of the switching part; and
a rectifying part, rectifying an output of the transformer to generate an output voltage (Vout) of the voltage converter, wherein
a magnetic part of the transformer and a magnetic part of an inductor of the rectifying part are provided by the magnetic apparatus of claim 1.

13. The voltage converter of claim 12, wherein the voltage converter comprises a current-doubler-rectifier (CDR) converter.

* * * * *